May 22, 1923.
H. J. DOOLAN
1,455,835
COMBINED INDICATOR AND RECORDER
Filed Nov. 20, 1920
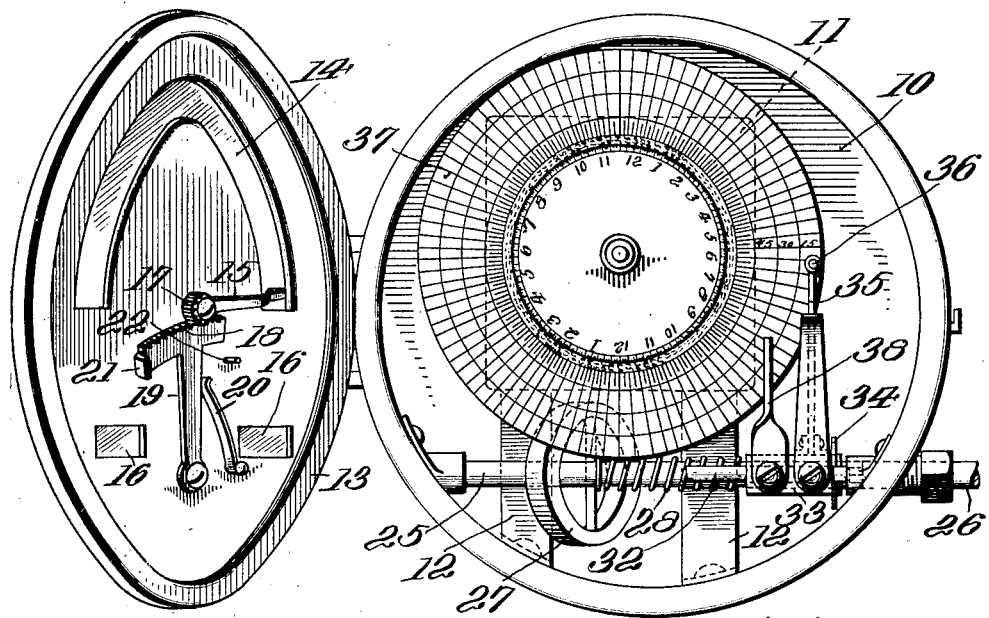
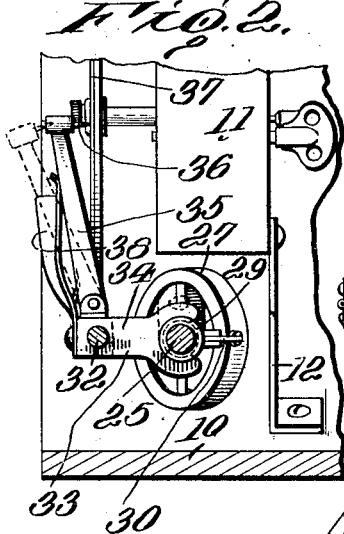
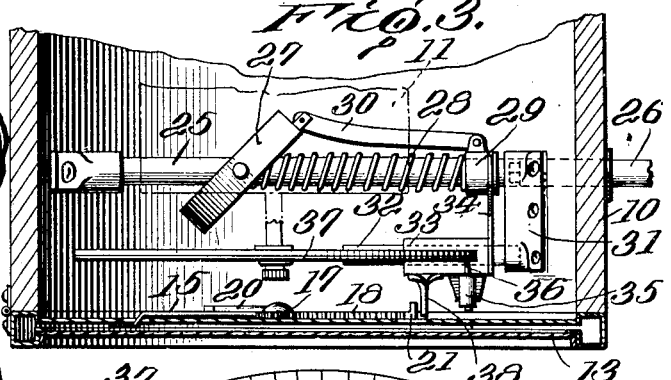
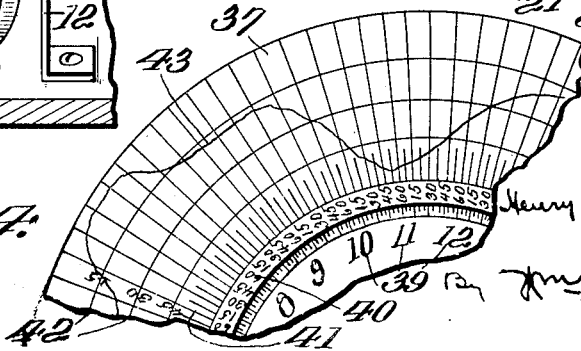
Inventor
Henry J. Doolan
By Jno. T. Hodges
Attorney.

Patented May 22, 1923.

1,455,835

UNITED STATES PATENT OFFICE.

HENRY J. DOOLAN, OF WASHINGTON, DISTRICT OF COLUMBIA.

COMBINED INDICATOR AND RECORDER.

Application filed November 20, 1920. Serial No. 425,405.

*To all whom it may concern:*

Be it known that I, HENRY J. DOOLAN, a citizen of the United States, residing at Washington, in the county of Washington and District of Columbia, have invented a new and useful Combined Indicator and Recorder, of which the following is a specification.

This invention is a device for indicating variations in speed of a travelling vehicle, and also for simultaneously securing a permanent record of the movements of the vehicle during any given period of time.

One of the objects of the invention is to provide an indicator of the speedometer type, combined with a recorder, and operated by actuating mechanism which is of simple construction, having its parts compactly arranged. A further object is to provide a device of the character mentioned, in which the speedometer and the recorder are accurately operated in unison from a common source of power. A further object is to provide recording means for indicating variations in speed from full stop to the possible maximum, and for recording the periods of duration of the successive variations.

The invention will be hereinafter fully set forth and particularly pointed out in the claims.

In the accompanying drawing:—

Figure 1 is a front elevation illustrating the casing with the cover open, and showing the parts in elevation and perspective. Figure 2 is a transverse sectional view on the line 2—2, Figure 1. Figure 3 is a horizontal sectional view on the line 3—3, Figure 1. Figure 4 is a detail view illustrating a portion of the chart.

Referring to the drawing, 10 designates a casing which may be of any preferred construction, and 11 is a clock mechanism of any suitable or preferred type, mounted upon standards 12, removably secured to the interior of the casing, said clock mechanism being conventionally shown.

The casing is provided with a hinged or movable cover 13, provided with an arcuate slot 14, through which extends the offset end of a pointer 15, pivotally mounted on the inner face of the cover. The exterior of the cover is provided with a scale (not shown), indicating miles per hour, conformable with standard speedometer practice. The cover may also be provided with slots 16 forming sight openings for the usual mileage and trip total counters (not shown).

The pivot end of the pointer 15 is provided with a pinion 17, meshing with an arcuate rack 18, carried by an arm 19, pivotally mounted on the inner face of the cover, a spring 20 acting against said arm to normally force it in a direction which will bring the pointer to zero position. Said rack is moved in opposition to the spring by means of an abutment member which will be described later, positioned to engage an offset or shoulder 21, such movement of the rack being limited by a stop 22.

Removably mounted in suitable bearings within the casing 10, is a governor shaft 25, having one end detachably connected with a drive shaft 26, which is connected with the wheel of the vehicle, or with any other moving part, in a manner so well understood in the art that it is not considered necessary to illustrate it in the drawing. Pivotally mounted upon said governor shaft 25 is a speed-responsive element 27, which is normally held in its inoperative position by means of a spring 28, which encircles said shaft and has one end bearing against said element 27, and the other end bearing against a collar 29, slidably mounted on said governor shaft. Said collar and the speed-responsive element 27 are connected by a link 30, as illustrated in Figure 3, whereby said collar is reciprocated by oscillations of the speed-responsive element. Rigidly supported in the bearing 31 which sustains one end of the shaft 25, is a guide shaft 32, on which is slidably mounted a sleeve 33, provided with a rigid arm 34, which engages the collar 29, so as to cause said sleeve to reciprocate with said collar. Pivotally supported by the sleeve 33 is a marker arm 35, provided with means for carrying a marking element 36, which normally engages a chart 37, mounted on the arbor of the clock mechanism, a spring acting to maintain the engagement. Rigidly secured to the sleeve 33 is an abutment member 38 positioned to engage the offset or shoulder 21 of the rack 18, when the cover 13 is closed.

The chart 37 may be of any desired arrangement. In the drawing is illustrated a circular sheet provided with a concentrically arranged series of numbers indicated at 39, representing the twenty four hours of a day, the numbers being so spaced that in the period of one hour, the clock mechanism will cause the chart to travel the distance between two of such numbers. Surrounding the series of numbers 39 is a second series of numbers 40, corresponding to subdivisions of time less than one hour, the scale 41 representing said divisions of time, being carried radially of the chart to the edge thereof. The chart is also provided with a series of concentric circles 42, indicating changes in the speed of the vehicle by which the recording device is carried.

In operation, the cover 13 is held normally closed by a suitable lock (not shown). Before the device is put into use, the cover 13 is opened and a chart 37 is secured to the arbor of the clock mechanism, the arm 35 being moved on its pivot to provide the necessary clearance. The spring which holds the marker in engagement with the chart is pivoted, as shown, so that it may be moved to one side to permit the arm 35 to drop away from the plane of the chart. After the chart is positioned the marker arm 35 is restored to its normal position with the marker 36 in contact with the chart, the spring being engaged with the arm to hold it in place. It will be noted that in the normal rest position, the marker 35 is in contact with the chart at a point as near to the edge thereof as is possible. The chart having been positioned, the cover is closed and locked, bringing the abutment 21 of the rack 18, in position to be engaged by the abutment member 38. After the parts have been adjusted as above outlined, the marker 36 will maintain its position in contact with the chart contiguous to the edge thereof, as long as the vehicle remains at rest, the clock mechanism causing said chart to travel in a clock-wise direction past said marker. Just as soon as the vehicle starts to travel, the governor shaft 25 is rotated at a speed which will vary with the speed of travel of the vehicle, the speed-responsive element 27 oscillating on said shaft, the extent and frequency of the oscillations varying with the different speeds at which the shaft 25 rotates. As the speed-responsive element 27 oscillates, it causes corresponding reciprocations of the collar 29, and through the connection of the latter with the sleeve 33, causes the marker to be reciprocated radially of the chart, producing a record of the character indicated at 43, Figure 4. At the same time the movable abutment member 38 engages and moves the rack 18, thereby causing the pointer 15 to oscillate on its pivot in conformity with the differences in speed, thus furnishing a visible indication of the speed at which the vehicle is travelling at any given time.

From the foregoing it will be readily understood that by means of the pointer 15, the driver of the vehicle always has before him an indication of the speed at which the vehicle is travelling, such as is usually provided by the standard speedometer, and at the same time a permanent record of all variations in speed is being made on the chart 37, the distance that the record line 43 is from the periphery of the chart, indicating the speed per hour at any particular time in the twenty four hours, and the distance traversed by the record line concentrically of the chart, represents the duration of time that the vehicle has travelled at the speed indicated. For instance, referring to Figure 4, the record indicates that from 7:30 to 8 o'clock, the vehicle was at rest; at 8:15 it was put in motion and until 9:30 travelled at approximately 15 miles per hour. From 9:30 to 10:45 the speed was gradually increased to nearly sixty miles per hour, and then gradually reduced so that at 12:45 it had reached a speed of slightly more than fifteen miles per hour.

The advantages of the invention will be readily apparent. By means thereof the owner of a vehicle can maintain a daily record of the operations of the vehicle, and from such record determine whether it has been surreptitiously used on the one hand, or whether the driver is not giving full service on the other hand, because he has an exact record for every minute of time during a twenty four hour period. The device is exceedingly simple in construction, and by locating the governor shaft 25 and the fixed shaft 32 contiguous to each other below the chart, a very compact construction is provided, which will not readily get out of order or become deranged, thereby insuring accuracy in operation.

Having thus explained the nature of the invention and described an operative manner of constructing and using the same, although without attempting to set forth all of the forms in which it may be made, or all of the forms of its use, what is claimed is:—

1. A combined indicator and recorder comprising a marker, a movable abutment member, a speed responsive element operatively connected with said marker and said abutment member to impart reciprocations thereto, a chart positioned to be engaged by said marker, means imparting movement to said chart, an indicator member having a projection, and a movable support for the indicator member normally maintaining the latter in a position to bring said projection into the path of movement of said abutment member.

2. A combined indicator and recorder comprising a casing, a movably mounted cover therefor, a marker and a movable abutment member reciprocably mounted within said casing, a speed-responsive element operatively connected with said marker and said abutment member to impart reciprocations thereto, a traveling chart positioned to be engaged by said marker, and indicator means mounted on said cover and positioned to be engaged and operated by said abutment member when the cover is closed.

3. A combined indicator and recorder comprising a reciprocably supported sleeve, a marker secured to said sleeve, an abutment member also secured to said sleeve, speed-responsive means for imparting reciprocations to said sleeve, a traveling chart positioned to be engaged by said marker, and indicator means having a portion lying in the path of movement of said abutment member.

4. A combined indicator and recorder comprising a rigidly supported guide shaft, a marker and an abutment member slidably mounted on said shaft, speed-responsive means for imparting reciprocations to said marker and said abutment member, a traveling chart positioned to be engaged by said marker, and indicator means having a portion lying in the path of movement of said abutment member.

5. A combined indicator and recorder comprising a rigidly supported guide shaft, a sleeve slidably mounted on said shaft, a marker and an abutment member carried by said sleeve, speed-responsive means for reciprocating said sleeve, a traveling chart positioned to be engaged by said marker, and indicator means having a portion lying in the path of movement of said abutment member.

6. In a combined indicator and recorder, a travelling chart and means for actuating the same, a governor shaft provided with speed-responsive means, a rigidly supported guide shaft contiguous to the governor shaft, a collar slidably mounted on the governor shaft and connected with the speed-responsive means, a sleeve slidably mounted on the guide shaft, a marker carried by said sleeve and positioned to engage said chart, and a rigid arm connecting said collar and said sleeve, whereby the sleeve is reciprocated.

7. In a combined indicator and recorder, a governor shaft provided with speed-responsive means, a guide shaft rigidly supported contiguous to said governor shaft, an abutment member slidably mounted on said guide shaft, indicator means positioned to be engaged and actuated by said abutment member, and a record-making member operating in unison with said abutment member.

8. In a combined indicator and recorder, a governor shaft provided with speed-responsive means, a guide shaft rigidly supported contiguous to said governor shaft, a sleeve slidably mounted on said guide shaft, an abutment member and a record making member carried by said sleeve, and indicator means positioned to be engaged and operated by said abutment member.

9. In a combined indicator and recorder, a governor shaft provided with speed-responsive means, a guide shaft rigidly supported contiguous to said governor shaft, an abutment member slidably mounted on said guide shaft, a record making member operating in unison with said abutment member, an indicator member, and an actuator therefor positioned to be engaged and moved by said abutment member.

10. In a combined indicator and recorder, a governor shaft provided with speed-responsive means, a guide shaft rigidly supported contiguous to said governor shaft, an abutment member slidably mounted on said guide shaft, a record making member operating in unison with said abutment member, an indicator member, and a movable actuator member engaging said indicator member and having an offset portion positioned to lie in the path of movement of said abutment member.

In testimony whereof I have hereunto set my hand.

HENRY J. DOOLAN.